United States Patent

[72] Inventor Thomas F. Peterson
Shaker Heights, Ohio
[21] Appl. No 96,522
[22] Filed Mar. 17, 1961
[45] Patented June 28, 1971
[73] Assignee Preformed Line Products Co.
Cleveland, Ohio

[54] APPLIANCE FOR LINEAR BODIES
2 Claims, 8 Drawing Figs.

[52] U.S. Cl....................................................... 174/84R,
24/131R, 57/145, 174/40R, 174/Dig.12, 248/63
[51] Int. Cl.................................................... H02g 15/08
[50] Field of Search........................................... 174/41-
—44, 79, 173, 136, 90, 94, 84; 248/63; 24/81.4,
81, 129 (C), 131, 123; 57/145, 144, 142; 159/31.5

[56] References Cited
UNITED STATES PATENTS

| 2,202,538 | 5/1940 | Selquist | 174/42 |
| 2,736,398 | 2/1956 | Peterson | 174/79UX |
| 2,761,273 | 9/1956 | Peterson | 174/79UX |
| 2,947,504 | 8/1960 | Ruhlman | 174/173X |
| 2,947,504 | 8/1960 | Ruhlman | 174/173 |
| 3,032,964 | 5/1962 | Peterson | 57/142X |

[11] 3,588,316

FOREIGN PATENTS 1,136,003  12/1956  France .................. 174/42

*Primary Examiner*— Darrell L. Clay
*Attorney*— Hume, Groen, Clement & Hume

CLAIM: CLAIM 1. The combination comprising a pair of linear bodies, a plurality of elements which have been helically formed prior to application to one of said linear bodies along two spaced portions of their lengths to a mutually conforming internal diameter and pitch length of sufficient magnitude so that the helically formed portions may be applied to at least one of said linear bodies from the side without exceeding the elastic limit and said helically formed spaced portions constituting a full lay, said plurality of elements being divided into a plurality of groups intermediate said helically formed spaced portions with each of said groups being intertwisted intermediate the helically formed spaced portions to form a closed lay having an internal diameter substantially smaller than the internal diameter of said helically formed spaced portions, the helically formed portion adjacent one end of said elements being wrapped around and coaxial with one of said linear bodies and the helically formed portions adjacent the other end of said elements being wrapped around and coaxial with the other of said linear bodies, said intertwisted portion being intermediate said linear bodies.

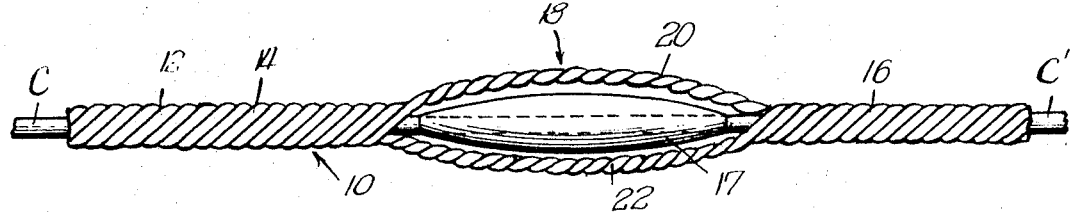
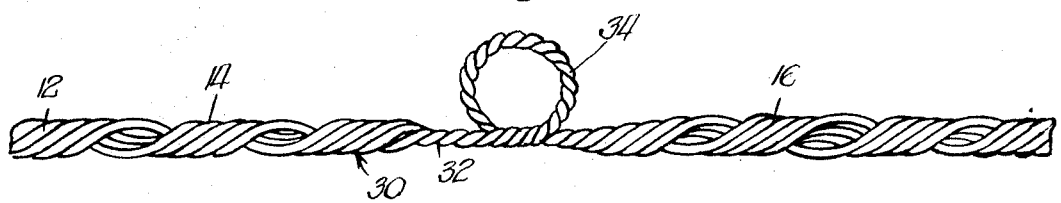
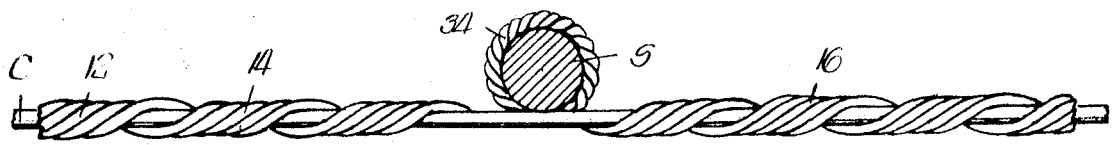
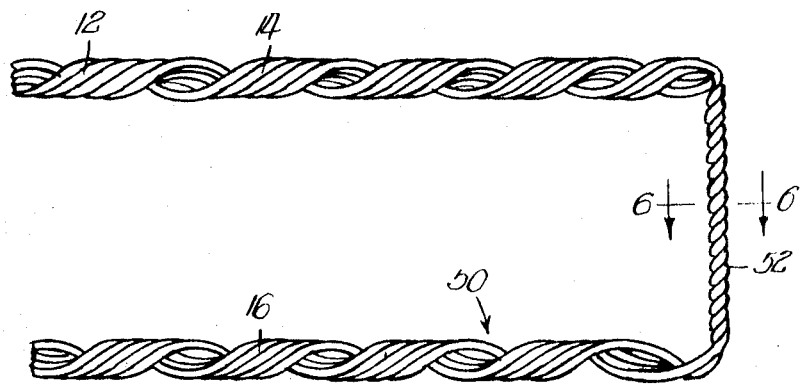
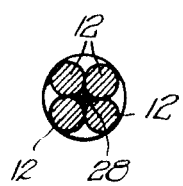

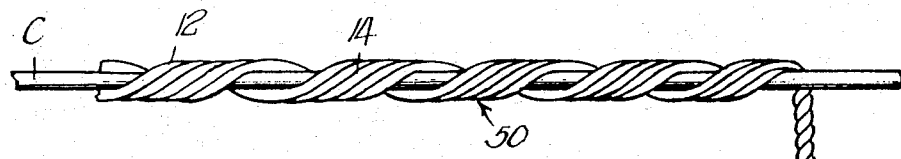
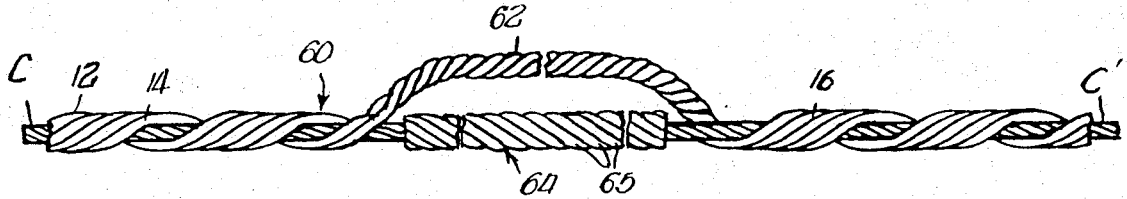
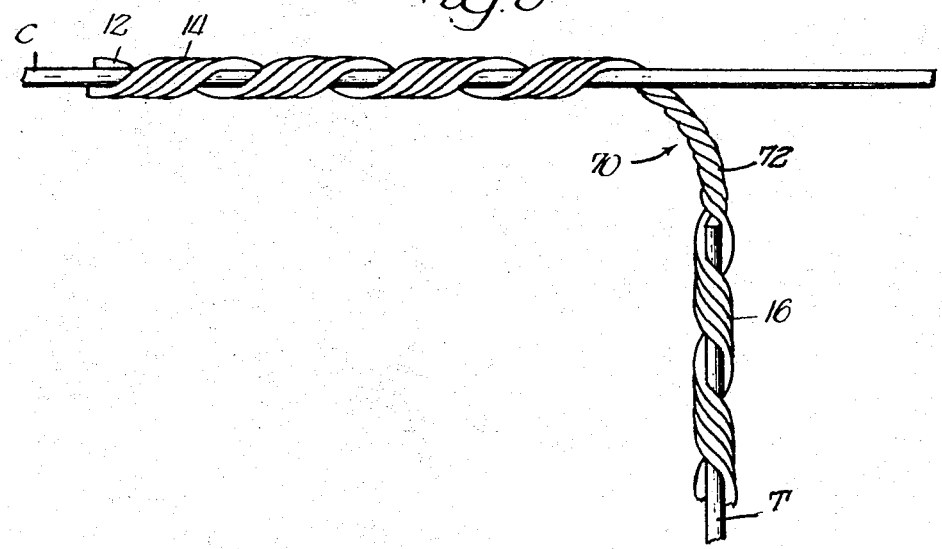
INVENTOR.
Thomas F Peterson,
BY
Byron, Hume, Groen + Clement
Atty.

APPLIANCE FOR LINEAR BODIES

This invention pertains to appliances for suspended linear bodies, such as electrical conductors and the like and more specifically, relates to appliances constructed from elements helically formed prior to application to such linear bodies.

Appliances constructed from preshaped helices are enjoying widespread usage and reference is made to my previously issued U.S. Pat. Nos. 2,609,653; 2,744,707; 2,761,273 and 2,959,632. One such appliance is especially suited for mechanically splicing two lengths of a linear body and maintaining the ends in a closely spaced relationship. Such an appliance comprises in essence, a plurality of elements which have been helically formed prior to their application to the linear bodies. The pitch length and internal diameter of the helically formed elements are of sufficient magnitude to permit application of the elements to the linear bodies from the side without exceeding their elastic limit. The internal diameter of the elements is normally somewhat less than the diameter of the linear bodies of association so that the latter forces the former to resiliently expand and thus grippingly engages the latter. The elements engage the first of the linear bodies for a portion of their length and the second linear body for the remainder of their length so that the ends of the linear bodies are in a closely spaced, substantially coaxial relationship. This arrangement provides an excellent mechanical splice which has enjoyed considerable commercial success.

In those instances where two conductors are spliced together, it would seem advantageous to use the helically formed construction to shunt the current from one conductor to the other. However, it has been found that where the splice is constructed in the conventional manner that it has several disadvantages which limit its applicability. For example, it has been found that in the conventional construction the respective elements are not always in uniform touching relationship with the conductor but are in varying contact resistance along the contact length and thus resulting in an uneven distribution of current in the several elements. One reason for the nonuniform resistance is that the elements are forced to expand in a way that results in varying pressure, and because of any nonconducting oxide present along the contact lengths. As a result of the heterogeneous distribution of current, those elements carrying a larger portion of the current are apt to become overheated and subject to oxidation. Furthermore, a high current load on one of the elements may tend to cause discharge and arcing between adjacent elements and/or conductor. These characteristics among others detract from the electrical efficiency of the prior art construction and consequently limit its applicability.

The subject invention has the foremost feature of providing a homogeneous distribution of current and thus obviating the difficulty encountered with prior art splices and other similar appliances constructed from helically formed elements where the appliance shunts current around another splicing device. At the same time, the subject invention includes substantially all of the advantages of appliances constructed from helically formed elements, such as ease of applicability, natural resiliency, gripping characteristics, minimum of stress concentration and the like.

Briefly, the invention may be characterized as a plurality of helically formed elements which include an intermediate portion in which the elements have been tightly intertwisted to form an essentially closed lay or stranded cablelike construction having an internal diameter substantially smaller than that of the portions adjacent their ends. In this manner the elements are forced into electrical and mechanical contact with each other. In some instances it may be desirable to twist the elements onto some suitable core material, such as conducting flock, shavings, wire, or a short strand, to further insure contact between the elements.

Another feature of the subject invention is the resiliency of the elements when intertwisted in this manner. It is well known that a suspended line is subjected to extended periods of vibration from the wind and other climatic elements. These vibrations make it desirable, if not necessary, for the appliance to be of a resilient nature, so as to flex with the wind and without creating an area of stress concentration at the point of attachment.

The invention has another feature of being applicable to those constructions in which the conductors have been previously mechanically spliced together without necessitating the removal or destruction of the previously applied splice. For example, the inventive electrical splice may be used in conjunction with conventional mechanical splices constructed of helically formed elements or with twisted, soldered, or compression joints with which the conductors have been joined together.

The resilient and current conducting characteristics of the closed lay construction also make the subject invention applicable to appliances other than splices. For example, as will be described hereinafter, the invention is applicable to tap wire hangers, lashing wire constructions, and spacers.

A foremost object of the invention resides in the provision of an appliance for suspended lines constructed of elements helically formed prior to application to the lines.

Another object of the invention resides in the provision of an appliance which is especially suited for use as an electrical splice between electrical lines for shunting current from one to another. The invention may also be used for appliances other than splices, such as spacers, hangers, and lashings.

A still further object of the invention resides in the provision of an electrical splice which is especially suited for use in conjunction with previously applied mechanical splices without the necessity of removing or altering the latter.

Still another object resides in the provision of an electrical shunt constructed in part of helically preshaped elements in which there is a homogeneous distribution of current between the elements.

A still further object resides in the provision of an appliance for electrical conductors that may be easily applied to such conductors without the necessity of special tool or skills.

These and other objects of the invention will be apparent upon reading of the specification with reference to the following drawings:

IN THE DRAWINGS

FIG. 1 is an elevational view of one embodiment of the invention as used for electrically splicing two conductors in conjunction with a mechanical and/or electrical splice for securing the ends of the conductors together.

FIG. 2 is a view in elevation of another embodiment of the invention suited for use in lashing a line to a supporting means such as an insulator.

FIG. 3 is an illustration of the embodiment shown in FIG. 2 as applied to a line and lashing to an insulator.

FIG. 4 is a view in elevation of another embodiment of the invention suitable for use as a spacer between adjacent suspended lines.

FIG. 5 illustrates the embodiment shown in FIG. 4 as applied to suspended lines.

FIG. 6 is a sectional view taken along the line 6—6 in FIG. 4.

FIG. 7 is a view in elevation of another embodiment suitable for use as a splice.

FIG. 8 is an elevational view of still another embodiment suitable for use as a tap wire hanger.

In the specification and claims the terms 'helically formed elements' will be used in describing the subject invention. By elements it is meant rodlike bodies which may be constructed of any suitable material having the requisite properties for carrying out their intended purpose. Where the appliance is to be used for conducting electricity from one point to another, it is to be understood that the elements will be constructed of a conducting material such as copper, aluminum and the like. In the drawings the elements are shown as having circular cross sections for purposes of example, but it is to be understood that they may have cross sections other than circular and that the showings in the drawings are not to be considered as limitations.

Referring now to FIG. 1 there is shown a first embodiment generally denoted by the numeral 10 adapted to be used for electrically splicing the ends of two suspended lines to pass current from one to the other. The suspended lines C and C' are of any conventional type and may be composed of a single strand or of a plurality of strands.

The appliance 10 is composed of a plurality of elements 12 which have been helically formed for a portion of their lengths prior to application to the conductors C and C'. As mentioned previously the elements 12 are formed so that the helix has an internal diameter and pitch length of sufficient magnitude to permit them to be applied to the conductor of association without exceeding their elastic limits. Generally where the elements are to grippingly engage the conductor of association, the internal diameter of the helix is somewhat less than the external diameter of the conductor, so that the latter forces the former to expand upon application thereto. In one preferred embodiment it has been found that, if the internal diameter of the helix is 85 percent of the external diameter of the conductor, optimum gripping characteristics are obtained. The gripping may be further enhanced by coating the interior of the helix with grit of some suitable type or by knurling of the elements. Since it is desired that the appliance conduct electricity from one line to the other, the grit should be of the conducting type. As a direct result of the tightly gripping engagement of the conductors by the elements, an excellent electrical union is formed so that the electrical current flows from one to the other with a minimum drop in potential.

Each of the elements 12 is helically formed for a first portion 14 and a second portion 16 of its length. The first portion 14 is adapted to receive the conductor C and has been helically formed in accordance with the gauge and type of conductor. Similarly, the portion 16 has been helically formed in accordance with the type and gauge of the conductor C'. It should be kept in mind that the conductors C and C' may be of dissimilar, as well as of similar, types and sizes. In the instance where they are dissimilar it may be necessary to form the portions 14 and 16 of different helical pitch lengths and diameters.

The conductors in this example have been mechanically spliced by a "wiped sleeve" construction 17 of a conventional type. In such a construction the ends of the conductors have been intertwisted to provide a mechanical joint and then the latter has been wiped with a soft metal such as lead to form a substantially smooth exterior which is generally ellipsoidal in shape. It is apparent that this type of joint will generally be conducting but it has been found that over a period of time the joint deteriorates electrically from oxidation and other causes so that the transmission efficiency drops. By applying the electrical splice embodying the invention, the inefficiencies of the leaded splice are overcome without detracting from the latter's mechanical strength. Where the two devices are used in combination it will be apparent that at least a portion of the electrical energy will pass through the splice 17. The ratio of the electrical energy in the two will depend in part upon the efficiency of the splice 17 and will vary as splice 17 deteriorates with age.

Intermediate the portions 14 and 16 the elements 12 have been diverted from their normal helical courses to bridge the ends of the conductors C and C' and the splice 17. The intermediate portion 18 is composed of the two groups of elements 20 and 22. Each of the groups 20 and 22 includes a half lay of the elements 12, which have been tightly intertwisted to form a closed lay or a stranded cablelike construction having an internal diameter substantially smaller than that of the portions 14 and 16. As a matter of fact in the preferred embodiment the elements in the intermediate portions 20 and 22 are twisted as tightly as possible. In this manner each of the elements is brought into engagement with the adjacent elements so that there are no gaps therebetween throughout the portions 20 and 22.

It will be apparent that the electrical splice 10 may in some instances be utilized for both electrically and mechanically joining the conductors C and C', particularly where the latter have not been previously joined. Moreover where the conductors have been previously spliced the splice 10 serves as a safeguard against parting of the former resulting from failure of the latter.

In some instances it may be desirable to provide the closed lay portion of the appliance with a conducting core of some suitable type as can best be seen in FIG. 6. The core may consist of a conducting grit which will insure electrical contact between all of the elements. Another example of a core would be a strand of wire or the like which would fill the space 28 and would be in contact with the elements 12 to further insure a homogeneous distribution of electrical current. A still further modification would consist of knurling the elements 12 so as to increase the area of contact therebetween and thus further facilitate the distribution of current.

Referring now to FIGS. 2 and 3 there is shown another embodiment of the invention adapted to be used for lashing a suspended conductor C to an insulator or other suitable support S and is generally denoted by the numeral 30. The appliance 30 is composed of a partial lay of elements 12 which have been helically formed in the manner previously described for the portions 14 and 16 of their length. Intermediate the portions 14 and 16 the elements have been tightly twisted to a closed lay 32 which has been bent back on itself to form a closed loop 34 with the portions 14 and 16 extending in opposite directions from the loop 34. In this embodiment the elements 12 form a partial lay or envelope in the portions 14 and 16 which are adapted to embrace the conductor C. The elements 12 are in bridging relationship so as to form a helical band throughout the portions 14 and 16 and thus only partially cover the conductor C as can best be seen in FIG. 4. The closed loop 34 is preferably formed to a diameter somewhat less than that of the insulator S to which it is applied. In this manner, when the loop is applied to the insulator S, it tightly embraces the latter to prevent inadvertent displacement therefrom. After the loop has been applied to the insulator the helically formed portions 14 and 16 are then wrapped around the conductor C so as to grippingly embrace the same.

Referring now to FIGS. 4 and 5 there is shown an embodiment, generally denoted by the numeral 50, adapted to be used for maintaining generally parallel lines in their spaced relationship and for transmitting current from one to the other if such should be desired. The embodiment 50 is constructed of the elements 12 which have been helically formed throughout the portions 14 and 16 as described previously. Intermediate the portions 14 and 16 the elements have been tightly twisted to form a closed lay 52 as previously described. The appliance 50 is generally U-shaped, with the helically formed portions 14 and 16 constituting the sides thereof and the closed lay portion 52 connecting the two or forming the cross portion of the U. It will be understood that the spacer may take on other forms such as those shown in the aforementioned patent.

Referring now to FIG. 5 the helically formed portion 14 is adapted to be applied to the conductor C and the helically formed portion 16 to the conductor C'. The closed lay portion 52 resiliently maintains the conductors C and C' in their generally spaced relationship as previously mentioned. The resiliency of the closed lay portion 52 permits some flexing of the lines at the point of coincidence so as to minimize any areas of stress concentration which would be conducive to fatigue failure. The closed lay portion 52 further provides, in the event that current is to be transmitted from one conductor to the other, a homogeneous distribution of electrical current between the elements 12.

In FIG. 7 there is shown another embodiment of the invention as used for splicing electrical conductors and generally denoted by the numeral 60. The appliance 60 comprises the helically formed portions 14 and 16 which are composed of a half lay of the elements 12. Intermediate the helically formed portions 14 and 16 the elements 12 are intertwisted to form a closed lay portion 62 which is adapted to bridge the ends of the stranded conductors C and C'.

In this example the ends of the conductors C and C' are mechanically and electrically joined by the splice 64 which is composed of the helically formed elements 65. The elements 65 are of the same hand of lay as the conductors C and C' and have a pitch length substantially equal thereto or slightly less than, so that they ride between the strands, as disclosed in U.S. Pat. No. 2,609,653. The elements 12 of the splice 60 are shown by way of example as being of the opposite hand of lay although they may be of the same hand of lay.

In FIG. 8 there is shown the invention as used for a tap wire hanger and generally denoted by the numeral 70. In such a construction the current from the conductor C or a portion thereof is transmitted to a tap wire T from a point intermediate the ends of the former. The appliance 70 consists of the elements 12 which include the helically formed portions 14 and 16. Intermediate the portions 14 and 16 the elements are intertwisted into a closed lay 72. The elements 12 intermediate the portion 14 and the closed lay 72 have been bent so that the portions 14 and 16 are at right angles to each other. As mentioned previously the tightly engaging relationship between the elements throughout the closed lay portion 72 facilitates efficient transmission of electrical current from the conductor C to the tap wire T.

It should also be noted that in many instances the tap wire T will be of a smaller diameter than the conductor C. In such instances the internal diameter of the helical portion 16 will be less than that of the portion 14 in order to accommodate the lesser size of the tap wire T.

From the foregoing it can be seen that the subject invention provides an appliance particularly suitable for use in conjunction with electrical conductors. In particular, the invention is adapted to be used where electrical current is to be passed or shunted from one conductor to another. However, the invention is not limited to use as a shunt and may certainly be applicable in these instances where current is not to be transmitted by the appliance.

Although certain specific terms have been used in describing the invention it is to be understood that these are merely by way of example and not to be construed as limitations. It will be apparent that certain modifications may be made within the scope of the claims without departing from the spirit of the invention.

I claim:

1. The combination comprising a pair of linear bodies, a plurality of elements which have been helically formed prior to application to one of said linear bodies along two spaced portions of their lengths to a mutually conforming internal diameter and pitch length of sufficient magnitude so that the helically formed portions may be applied to at least one of said linear bodies from the side without exceeding the elastic limit and said helically formed spaced portions constituting a full lay, said plurality of elements being divided into a plurality of groups intermediate said helically formed spaced portions with each of said groups being intertwisted intermediate the helically formed spaced portions to form a closed lay having an internal diameter substantially smaller than the internal diameter of said helically formed spaced portions, the helically formed portion adjacent one end of said elements being wrapped around and coaxial with one of said linear bodies and the helically formed portions adjacent the other end of said elements being wrapped around and coaxial with the other of said linear bodies, said intertwisted portion being intermediate said linear bodies.

2. The combination comprising a pair of linear bodies in which the ends of said linear bodies are in a closely spaced relationship, a plurality of elements which have been helically formed prior to application to one of said linear bodies along two spaced portions of their lengths to a mutually conforming internal diameter and pitch length of sufficient magnitude so that the helically formed portions may be applied to at least one of said linear bodies from the side without exceeding the elastic limit, said elements being intertwisted intermediate the helically formed spaced portions to form a closed lay having an internal diameter substantially smaller than the internal diameter of said helically formed spaced portions, the helically formed portion adjacent one end of said plurality elements being wrapped around in gripping engagement and coaxial with one of said linear bodies adjacent the end thereof and the helically formed portions adjacent the other end of said elements being wrapped around in gripping engagement and coaxial with the other of said linear bodies, said intertwisted portion being intermediate said ends of said linear bodies, and including a mechanical splice extending between and embracing said closely spaced ends of said linear bodies.